UNITED STATES PATENT OFFICE 2,264,966

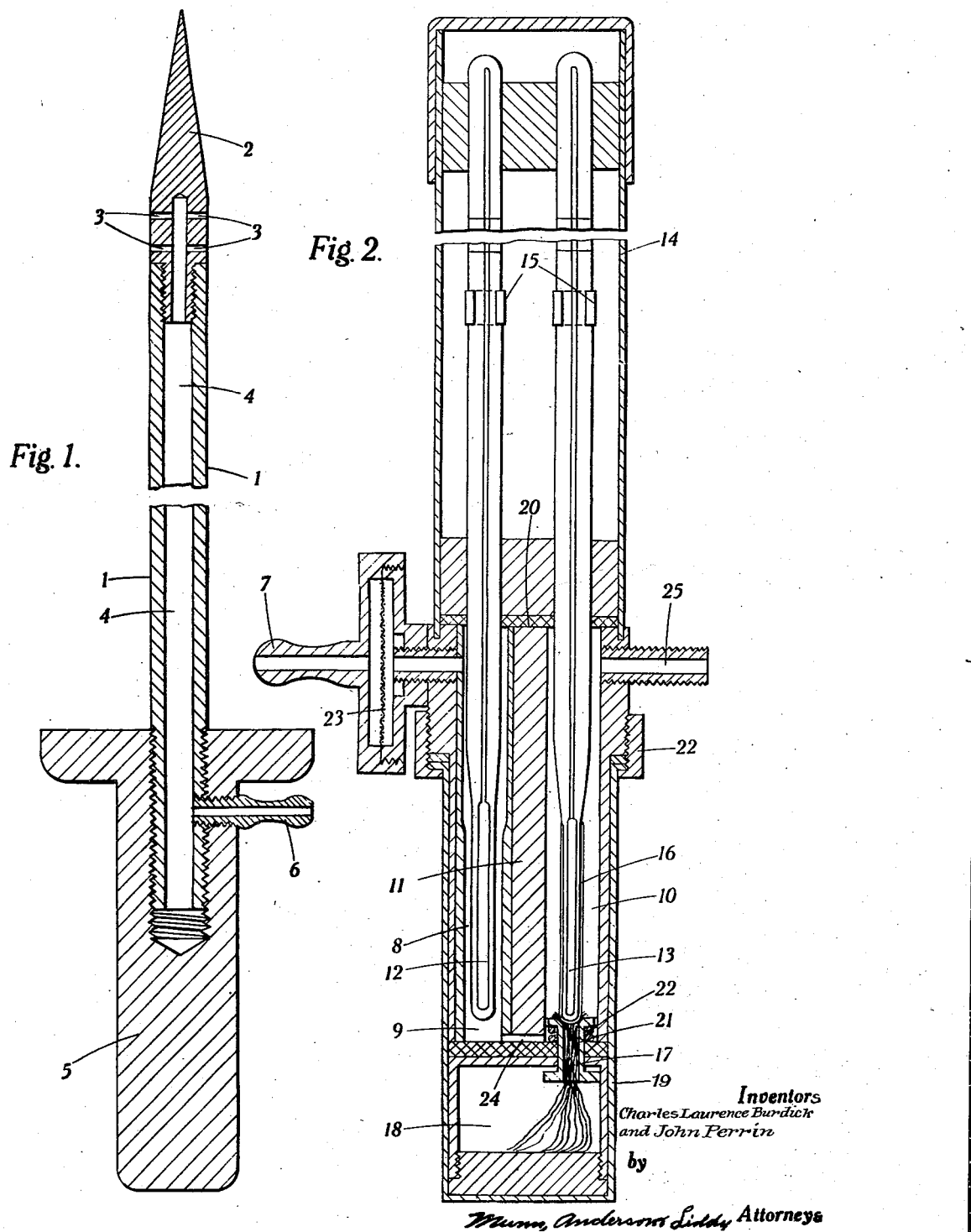

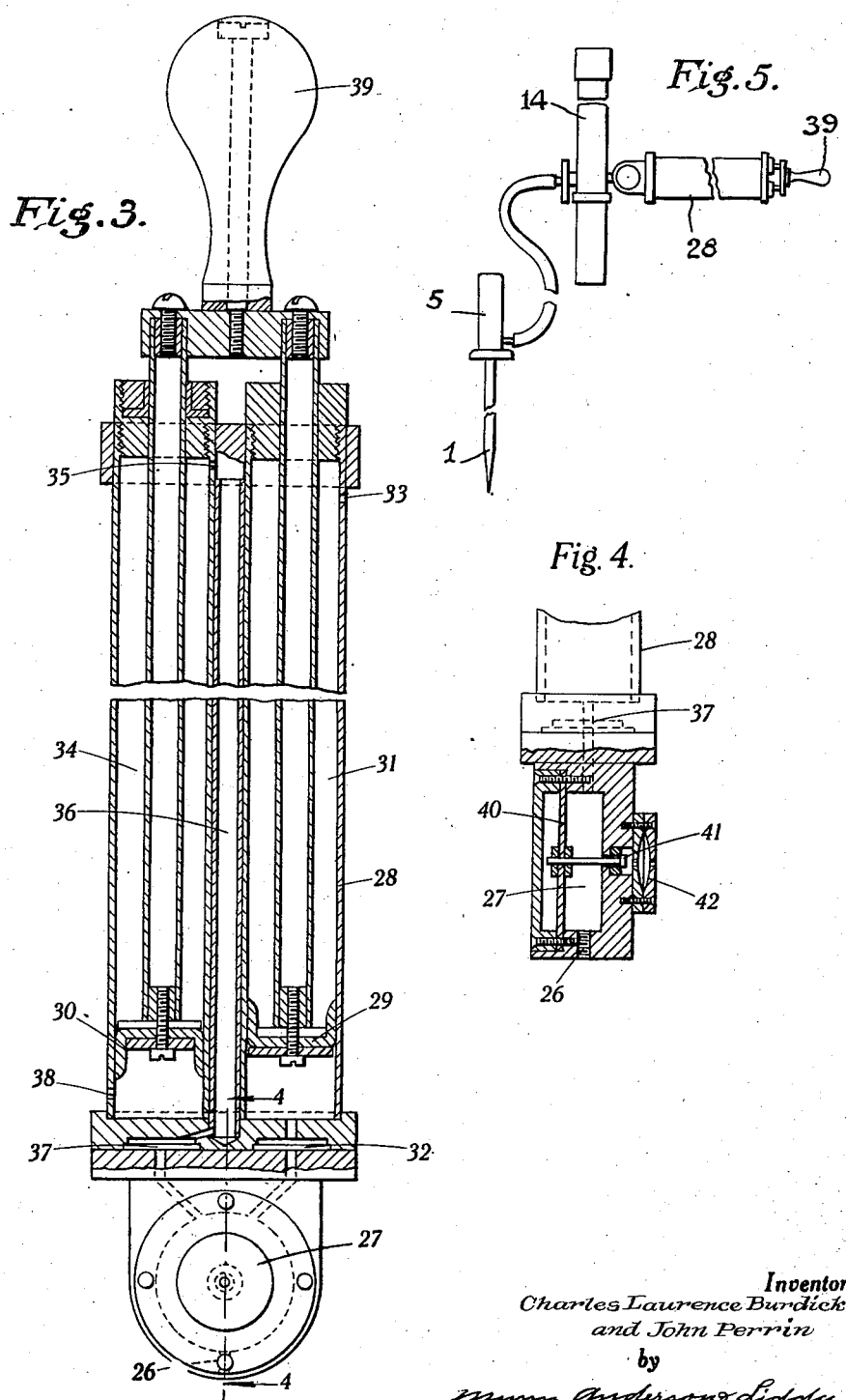

DETERMINATION OF THE MOISTURE CONTENT OF SUBSTANCES

Charles Laurence Burdick and John Perrin, London, England

Application August 31, 1939, Serial No. 292,906
In Great Britain September 29, 1938

6 Claims. (Cl. 73—338)

This invention relates to the determination of the moisture content of substances such as tea, tobacco, grain, paper, spun or woven fabrics, sand, earth and generally such substances as have air in the composition of their bulk or within their corporate interstices.

It is an object of the present invention to provide an apparatus for determining the moisture content of such substances in which air is withdrawn from the bulk of substance under test or its interstices and passed over dry and wet bulb thermometers so that the difference in readings of the two thermometers gives a measure of the humidity of this air and thus of the moisture content of the air withdrawn.

It is a further object of the invention to provide apparatus in which a tubular insertion piece with one or more orifices leading through the wall of the tube at the entry end is forced into the substance to be tested and the protruding end is connected to an air tight chamber forming an elongated path and containing the bulbs of a dry-bulb and a wet-bulb thermometer arranged so that the air passes firstly over the dry bulb and then over the wet bulb. The air is conveniently drawn through the apparatus by a suction pump which is preferably of the double-acting type so that it provides a continuous flow of air over the thermometer bulbs and prevents a backward movement which would give a false reading to the dry-bulb thermometer.

By obtaining the difference between the readings of the dry and wet bulb thermometers the relative humidity of the air may be determined and as the moisture of the air will bear a definite relation to the percentage of water in the substance a high degree of accuracy may be obtained as to the water content of the substance.

By carrying out a series of tests the percentage by weight of water to the solid substance can be tabulated for reference.

Another object of the invention is to provide indicating means, such as sliding markers, to preserve readings of the wet or dry bulb thermometers, or both, existing at any particular time.

It is also an object of the invention to prevent the rate of evaporation from the wet bulb thermometer from becoming unduly high and this is conveniently effected by providing means such, for example, as a vent controlled by a spring or a valve member carried by a diaphragm to admit outside air directly into the apparatus when a certain minimum pressure is reached so as to prevent the suction from increasing beyond this point. Means for giving a suitable audible or visible warning signal may be provided to indicate when this minimum pressure is reached.

Other objects and advantages of the present invention will be disclosed in an illustrated embodiment which will be described by way of example and of which the new or improved features, combinations and arrangements of parts form parts of the invention.

In the drawings forming a part of this specification:

Figs. 1 and 2 represent longitudinal sections respectively through an insertion piece and through an airflow chamber containing wet and dry bulb thermometers, Fig. 3 represents an elevational view, chiefly in section, of a suction pump device, and Fig. 4 is a fragmentary section on the line 4—4 of Fig. 3.

Fig. 5 is a view in elevation showing a complete assemblage of the apparatus.

Referring to the drawings, the insertion piece as shown in Fig. 1 comprises a long tubular member 1 with a pointed end 2 which is forced into the substance to be tested. Alternatively the tubular piece may be shaped for insertion between the sheets of a stack of paper or other material, and provided with a central air passage, external air conduits and a roughened surface to permit a flow of air between the paper and the insertion piece. The end 2 is provided with a suitable number of air inlet orifices 3 which communicate with a central passage 4 in the tube 1. The other end of the tube 1 is fitted into a handle 5 which also serves as a stop to limit the penetration of the tube into the substance.

An air outlet orifice in the form of a nozzle 6 extends through the handle 5 into the tube 1 and this air outlet nozzle 6 is connected by flexible tubing or other suitable means (not shown) to an air inlet nozzle 7 of a wet and dry bulb airflow chamber 8.

The chamber 8 is divided by a central partition 11 into two narrow compartments 9 and 10 which are arranged to receive the lower ends of a dry bulb thermometer 12 and a wet bulb thermometer 13 respectively. The stems of the thermometers 12 and 13 project above the chamber 8, through an air tight packing 20, and are carried by an open support 14 of suitable form which either bears calibration markings for the thermometers or forms a background against which the readings are clearly visible. In order that a reading at any time may be preserved, a slidable spring clip 15 is provided on each of the thermometer stems so that it can be moved to the appropriate position to mark the position of the existing reading.

The bulb of the thermometer 13 is covered with a muslin or other suitable wrapping 16 which contacts a wick 17 passing into a fluid reservoir 18 through a sleeve 21 which is pressed upwardly by a spring 22 so as to maintain contact between the wick and the material surrounding the bulb.

The reservoir 18 is held in position against the base of the chamber 8 by a cover 19 which is secured in position by a flanged collar 22 screwed onto the body of the chamber.

The joints in the air chambers 9 and 10 are made air-tight so that there is no leakage of outside air into them. The air from the substance under test is drawn through the nozzle 7 and an air filter 23 into the top of the chamber 9. The air then passes down this chamber over the bulb of the thermometer 12 and through a passage 24 into the lower end of the chamber 10. The air is then drawn up over the wet bulb of the thermometer 13 and passes out of the chamber 10 through an orifice 25 at its upper end.

The outlet orifice 25 is connected to an inlet opening 26 which leads to the safety diaphragm chamber 27 connected to the base of a suction pump apparatus 28.

The pump 28 is of the double-acting type, having two pistons 29 and 30 which operate in opposite directions.

The piston 29 reciprocates in a cylinder 31 which is connected at its lower end through a non-return valve 32 with the diaphragm chamber 27. The upper end of the cylinder 31 is provided with an air exhaust hole 33.

The piston 30 reciprocates in a cylinder 34 which is connected at its upper end through an orifice 35 with a central passage 36 which leads, through a non-return valve 37, to the diaphragm chamber 27. The lower end of the cylinder 34 is provided with an air exhaust hole 38.

In the apparatus shown the pump 28 is arranged to be worked by hand by means of a handle 39 to which the pistons 29 and 30 are attached, but it may be modified for power operation if desired.

On the up-stroke of the handle 39, from the position shown in Fig. 3, the piston 29 draws air through the insertion piece 1, the thermometer chambers 9 and 10 and the diaphragm chamber 27 and it enters the cylinder 31 through the non-return valve 32, air from the other side of the piston 29 being expelled through the exhaust orifice 33. The up-stroke of the piston 30 is its return stroke and air passes across the piston from the upper side to the lower, the non-return valve 37 preventing air from passing back into the diaphragm chamber 27.

On the down-stroke of the handle 39 the operation of the two pistons is reversed, the piston 30 drawing air into the upper end of the cylinder 34 through the thermometer chambers and exhausting air from the lower end of the cylinder 34 through the orifice 38. In the cylinder 31 air passes across the piston 29 from the lower side to the upper side.

On each stroke the air entering the one or other of the cylinders passes through the chamber 27 and if the suction produced exceeds a certain maximum a diaphragm 40 is pulled into the chamber and so opens a valve 41 carried by the diaphragm and allows air to enter. When this occurs a whistle 42, arranged over the valve opening, gives a warning.

By providing a double-action suction pump, the passage of air over the thermometers is substantially continuous and so does not enable air to pass in the reverse direction and give a false reading to the dry-bulb thermometer.

Although certain specific features have been described in some detail, it is to be understood that they have been given by way of example only and that the invention includes such appropriate ommissions, equivalents or alternatives as come within the spirit of the invention.

While certain parts have been described in specific terms for reference, it is intended that these terms shall be interpreted as generically as the art will permit.

We claim:

1. Apparatus for determining the moisture content of substances comprising in combination walls defining two communicating spaces, a dry bulb thermometer having its bulb positioned in one of said spaces, a wet bulb thermometer having its bulb positioned in the other of said spaces, a tubular member for inserting into the substance under test, means for placing the tubular member into communication with the said dry bulb space, suction creating means connected to the said wet bulb space and serving to withdraw air from the bulk of substance under test or its interstices and draw it in succession through the tubular member and the dry and wet bulb spaces respectively, a diaphragm responsive to suction produced in the apparatus and a valve controlling a vent placing the space subject to suction action in communication with the atmosphere, said valve being connected to the diaphragm and automatically opening when the suction on the diaphragm reaches a predetermined maximum.

2. Apparatus for determining the moisture content of substances comprising a tubular insertion member for placing in the body of the substance under test, a wet and dry bulb thermometer device having a closed chamber, partition means dividing the chamber into two communicating parts, a dry bulb thermometer arranged with its bulb depending into one of the said parts of the chamber, a wet bulb thermometer arranged with its bulb depending into the other of the said parts of the chamber, conduit means connecting the said dry bulb part of the chamber with the said insertion member, a double-acting suction pump, conduit means connecting the pump to the said wet bulb part of the chamber, means for automatically limiting the suction produced in the apparatus to a predetermined maximum and means for giving a warning signal when the said predetermined maximum suction is reached.

3. Apparatus for determining the moisture content of substances comprising in combination walls defining two communicating spaces, a dry bulb thermometer having its bulb positioned in one of said spaces, a wet bulb thermometer having its bulb positioned in the other of said spaces, a tubular member for inserting into the substance under test, means for placing the tubular member into communication with the said dry bulb space, suction creating means connected to the said wet bulb space and serving to withdraw air from the bulk of substance under test or its interstices and draw it in succession through the tubular member and the dry and wet bulb spaces respectively, a diaphragm responsive to suction produced in the apparatus, a valve controlling a vent placing the space subject to suction action in communication with the atmosphere, said valve being connected to the diaphragm and automatically opening when the suction on the diaphragm reaches a predetermined maximum and means for giving a warning signal when the said predetermined maximum suction is reached.

4. Apparatus for determining the moisture content of substances comprising in combination walls defining two communicating spaces, a dry bulb thermometer having its bulb positioned in one of said spaces, a wet bulb thermometer having its bulb positioned in the other of said spaces, a tubular member for inserting into the substance under test, means for placing the tubular member into communication with the said dry bulb space, suction creating means connected to the said wet bulb space and serving to withdraw air from the bulk of substance under test or its interstices and draw it in succession through the tubular member and the dry and wet bulb spaces respectively, a diaphragm responsive to suction produced in the apparatus, a valve controlling a vent placing the space subject to suction action in communication with the atmosphere, said valve being connected to the diaphragm and automatically opening when the suction on the diaphragm reaches a predetermined maximum and a whistle connected to the said valve to give an audible signal when the valve is opened.

5. Apparatus for determining the moisture content of substances comprising in combination a closed chamber forming an elongated path, a dry bulb thermometer having its bulb positioned in one portion of the said chamber, a wet bulb thermometer having its bulb positioned in another portion of the said chamber, a liquid absorbent covering on the bulb of the wet bulb thermometer, a liquid reservoir, a wick having an upper portion in contact with said covering and the lower end in the reservoir, an enclosing member for the wick, said wick being supported by the enclosing member, spring means urging the enclosing member towards the covering and the upper end of the wick against the said wet bulb covering for maintaining contact therebetween, means for placing the said dry bulb portion of the chamber into communication with the substance under test and means for withdrawing air from the bulk of the said substance or its interstices and passing it first through the said dry bulb portion of the chamber and then through the said wet bulb portion.

6. Apparatus for determining the moisture content of substances comprising in combination a closed chamber forming an elongated path, a dry bulb thermometer having its bulb positioned in one portion of the said chamber, a wet bulb thermometer having its bulb positioned in another portion of the said chamber, means for placing the said dry bulb portion of the chamber into communication with the substance under test, suction means for withdrawing air from the bulk of the said substance or its interstices and passing it first through the said dry bulb portion of the chamber and then through the said wet bulb portion and means for automatically limiting the suction in the chamber to a predetermined maximum irrespective of the permeability of the substance.

CHARLES LAURENCE BURDICK.
JOHN PERRIN.